United States Patent [19]
Ishii

[11] Patent Number: 5,873,041
[45] Date of Patent: Feb. 16, 1999

[54] MOBILE TELEPHONE LOCATION SYSTEM

[75] Inventor: Katsuhiro Ishii, Tokyo, Japan

[73] Assignee: NEC Corporation, Japan

[21] Appl. No.: 558,812

[22] Filed: Nov. 15, 1995

[30] Foreign Application Priority Data

Nov. 15, 1994 [JP] Japan .................................. 6-280203
[51] Int. Cl.$^6$ .............................. H04B 1/38; G01S 3/02
[52] U.S. Cl. ........................... 455/457; 455/435; 342/359
[58] Field of Search .................................. 455/33.1, 33.2,
455/33.3, 54.1, 56.1, 67.6, 456, 457, 525,
517, 435; 364/460; 379/59, 60; 340/990,
995; 342/457, 359, 368

[56] References Cited

U.S. PATENT DOCUMENTS

| 4,728,959 | 3/1988 | Maloney et al. | 342/457 |
| 4,823,137 | 4/1989 | Mallick | 342/457 |
| 4,897,661 | 1/1990 | Hiraiwa | 342/457 |
| 5,119,504 | 6/1992 | Durboraw, III | 455/54.1 |
| 5,155,689 | 10/1992 | Wortham | 340/990 |
| 5,280,293 | 1/1994 | Tong | 342/457 |
| 5,327,144 | 7/1994 | Stilp et al. | 342/457 |
| 5,444,450 | 8/1995 | Olds et al. | 455/54.1 |
| 5,583,514 | 12/1996 | Fulop | 342/359 |

FOREIGN PATENT DOCUMENTS

| 64-71226 | 3/1989 | Japan . |
| 1-297920 | 12/1989 | Japan . |
| 5-328432 | 12/1993 | Japan . |

Primary Examiner—Nguyen Vo
Assistant Examiner—Lester G. Kincaid
Attorney, Agent, or Firm—Ostrolenk, Faber, Gerb & Soffen, LLP

[57] ABSTRACT

In response to a position registration request transmitted from a mobile telephone terminal $1a$ (or $1b$), at least one base station $2_1$ (or $2_N$) selected by the mobile telephone terminal transmits a response signal to the mobile telephone terminal which measures a receiving electric field strength of the received response signal and a time between the transmission of the position registration request and the reception of the response signal. The mobile telephone terminal calculates a distance between it and the base station and a direction to the base station on the basis of the measured electric field strength and the measured time and displays the results of calculation. The mobile telephone terminal reports the results of calculation to a central controller 4 through the base station and a control station 3 to store it in a portion of a subscriber information memory 5 corresponding thereto. The central controller 4 reads out a stored information from the subscriber information memory 5 in response to a notice request from the fixed telephone terminal 6 and notifies it to the fixed telephone terminal 6 to display it on a display device of the latter.

42 Claims, 4 Drawing Sheets

MOBILE TELEPHONE LOCATION SYSTEM

BACKGROUND OF THE INVENTION

1. Field of the Invention

The present invention relates to a mobile radio telephone system and, particularly, to a mobile radio telephone system in which a service area is constructed with a plurality of base stations and a mobile telephone terminal performs a communication with one or more of the base stations, which are selected thereby, as the other side of the communication.

2. Description of the Related Art

In a mobile radio telephone system, it is generally impossible for one side of a communication to determine a location of a mobile telephone terminal which is the other side of the communication since the latter terminal may move. In order to solve such problem, for example, Japanese Patent Application Laid-open Nos. H-328432 and S64-71226 disclose mobile radio telephone systems in each of which one side of a communication can know an area in which a mobile telephone terminal which is the other side of the communication is currently located.

In detail, the mobile radio telephone system disclosed in Japanese Patent Application Laid-open No. H5-328432, which will be referred to as "first prior art", hereinafter, is a cordless telephone system including at least one telephone connecting device for connecting a plurality of cordless telephone sets each having a display device. The mobile telephone system includes a position registration information memory portion and an inter-call processing portion and, when an inter-call is performed by one of the cordless telephone sets to another, the position registration information memory portion is referred to obtain a positional information of the connecting device used by the calling side cordless telephone set and the called side cordless telephone set and the positional information of the calling and called sides thus obtained is transmitted to the called side cordless telephone set and the calling side cordless telephone set as data to be displayed on display portions of the called and calling side cordless telephone sets, respectively, so that the positional information of one of the two cordless telephone sets is displayed on the display device of the other cordless telephone set, or vice versa.

On the other hand, the mobile radio telephone system disclosed in Japanese Patent Application No. S64-71226, which will be referred to as "second prior art", hereinafter, is provided on an exchanger side with a position display device for displaying a positional information of mobile radio telephone terminals. That is, in this mobile radio telephone system, the automatic position detecting function which is inherent to the mobile radio telephone system is utilized. The exchanger connected to a plurality of base stations through radio interface circuits stores positional information of respective mobile radio telephone terminals existing in radio zones of the base stations and displays the information on the position display devices thereof.

Further, Japanese Patent Application Laid-open No. H1-297920 discloses a service system for informing a location of a mobile radio telephone in which an area in which a mobile radio telephone exists is informed by means of audio sound, which will be referred to as "third prior art", hereinafter.

However, in the first prior art, it is only possible to display the positional information of one of the cordless telephones on the display device of the other cordless telephone under the limited condition of the intercommunication between the cordless telephone sets. In the second prior art, it is impossible to display a position on the side of the mobile telephone terminal since the position display device is provided on the exchanger.

In any of the first, second and third prior arts, it is impossible for a mobile telephone terminal to confirm a position of a base station, a distance from the mobile telephone terminal to the base station and a direction of the base station seen from the mobile telephone terminal and to inform the distance and the direction of the base station related to the mobile telephone terminal to the other telephone terminal, although it is possible to confirm an area in which the mobile telephone terminal exists.

SUMMARY OF THE INVENTION

An object of the present invention is to provide a mobile radio telephone system in which a mobile telephone terminal can confirm a position and direction of a related base station seen from the mobile telephone terminal and can inform the information to the other mobile telephone terminal.

A mobile radio telephone terminal according to the present invention includes a first detector circuit for detecting a distance between the mobile radio telephone terminal and a signal source transmitting a first signal to the mobile radio telephone terminal, a second detector circuit for detecting a direction of the signal source-seen from the mobile radio telephone terminal and a display circuit for displaying a detected distance and a detected direction.

The mobile radio telephone terminal may further include a transmitter circuit for transmitting a second signal to the base station, a receiving circuit for receiving a third signal transmitted from the signal source in response to the second signal and a measuring circuit for measuring a time between transmission of the second signal and reception of the third signal, wherein the distance between the signal source and the mobile radio telephone terminal is detected by the first detector circuit on the basis of the time measured by the measuring circuit.

The receiving circuit is preferably a phased array antenna.

The mobile radio telephone terminal may further include a third detector circuit for detecting a receiving electric field strength of the third signal and an azimuth information generator circuit for generating an azimuth information on the basis of the receiving electric field strength, wherein the second detector circuit detects the azimuth information when the receiving electric field strength becomes maximum, as the direction of the signal source.

The transmitting circuit can transmit an information signal indicative of the distance and position to the signal source.

According to another aspect of the present invention, in a mobile radio telephone system in which an available service area is constructed by radio zones of a plurality of base stations and one mobile telephone terminal communicates with the other mobile telephone terminal through at least one base station selected by the one mobile telephone terminal, the mobile telephone terminal includes a first detector circuit for detecting a distance between the base station and the mobile telephone terminal, a second detector circuit for detecting a direction of the base station looked from the mobile radio telephone terminal and a display circuit for displaying the distance and the direction. The base station can receive an information signal indicative of the distance and the direction from the mobile telephone terminal and stores it.

Further, the base station gives a notice of the distance and direction related to the mobile telephone terminal to a fixed telephone terminal upon a position notice request from the latter. The base station may respond to the position notice request from the fixed telephone station after the base station receives a report enabling signal from the mobile telephone terminal.

According to the present invention, a method of controlling a mobile radio telephone terminal is provided, which includes the steps of detecting a distance between a signal source and the mobile radio telephone terminal, detecting a direction of the signal source looked from the mobile telephone terminal and displaying the distance and the direction. The control method may further includes the steps of transmitting a first signal from the mobile telephone terminal to the signal source, receiving a second signal transmitted by the signal source in response to the first signal, measuring a time from the transmission of the first signal to the reception of the second signal and detecting the distance on the basis of the measured time.

The control method may further include the steps of detecting a receiving electric field strength of the second signal, generating an azimuth information on the basis of the receiving electric field strength and determining the azimuth information when the receiving electric field strength becomes maximum, as the direction of the base station.

The control method may further include the steps of detecting a receiving electric field strength of the second signal, generating an azimuth information on the basis of the detected electric field strength and determining the azimuth information when the receiving electric field strength becomes maximum, as the direction of the base station.

In the control method of a mobile radio telephone system in which an available service area is constructed by radio zones of a plurality of base stations and one mobile telephone terminal communicates with the other mobile telephone terminal through at least one base station selected by the one mobile telephone terminal, the control method includes the steps of detecting a distance between the base station and the mobile telephone terminal, detecting a direction of the base station looked from the mobile telephone terminal and displaying the distance and the direction. The base station can receive an information signal indicative of the distance and the direction from the mobile telephone terminal and stores it. Further, the base station gives notice of the distance between the mobile telephone terminal and the base station and the direction of the base station looked from the mobile telephone terminal to a fixed telephone terminal upon a position notice request from the layer. The base station may respond to the position notice request from the fixed telephone terminal after the base station receives a notice enabling signal from the mobile telephone terminal.

In the present invention, the mobile telephone terminal calculates the distance between it and the base station and the direction of the base station seen from the mobile telephone terminal, displays them on the display circuit thereof and transmits an information of the calculated results to the base station. The calculated results received by the base station is stored in the memory circuit of the base station together with an information indicative of the received base station. The information stored in the memory circuit is read out upon the notice request from the fixed telephone terminal, transmitted to the fixed telephone terminal and displayed on the notice information display circuit thereof. Therefore, both the sending mobile telephone terminal and the receiving fixed telephone terminal can display the distance between the mobile telephone terminal and the base station and the direction of the base station seen from the mobile station on their display circuits, respectively.

BRIEF DESCRIPTION OF THE DRAWINGS

These and other objects, features and advantages of the present invention will become more apparent from the following detailed description taken in conjunction with the accompanying drawings in which.

In the drawings, the same reference numerals denote the same structural components.

DETAILED DESCRIPTION OF THE PREFERRED EMBODIMENTS

Figure 1:
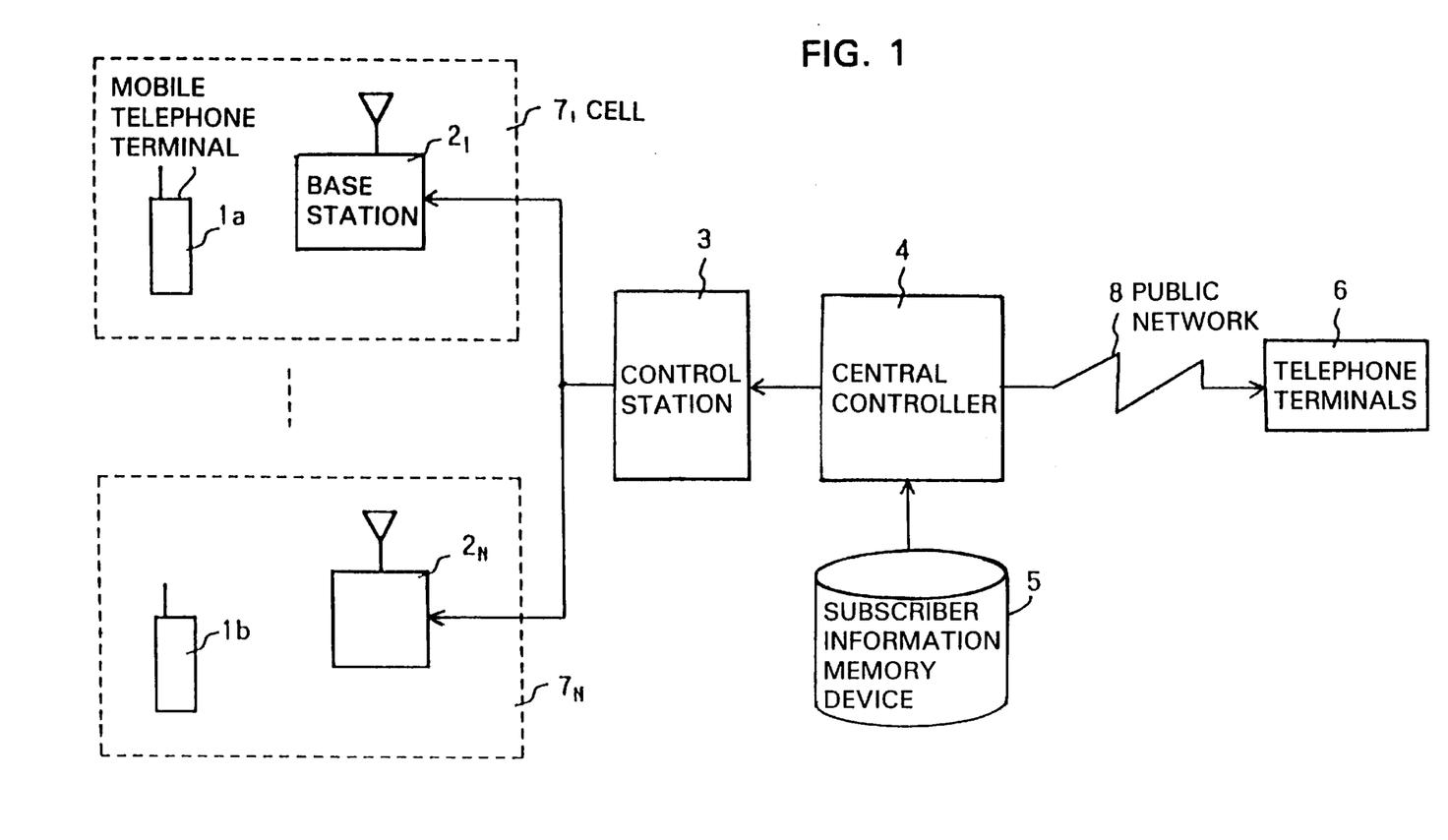
FIG. 1 is a block diagram showing schematically an embodiment of a mobile radio communication system according to the present invention.

An embodiment of the present invention will be described in detail. FIG. 1 shows a construction of an embodiment of a mobile radio telephone system according to the present invention. As shown in FIG. 1, the mobile radio telephone system includes mobile telephone terminals 1a and 1b, base stations $2_1$ to $2_N$, a control station 3, a central controller 4, a subscriber information memory device 5, telephone terminals 6 and a public network 8.

The N base stations $2_1$ to $2_N$, where N is an integer larger than 1 are connected to the common control station 3 which is in turn connected to the central controller 4 and each of the base stations performs a radio communication with at least one mobile telephone terminal when the latter exists in one of radio zones (cells) $7_1$ to $7_N$, which is covered by the base station, under control of the central controller 4. In the example shown in FIG. 1, the mobile telephone terminals 1a and 1b exist in the radio zones $7_1$ and $7_N$, respectively.

The central controller 4 functions to write information of subscribers in the subscriber information memory device 5 and to read it therefrom on demand. The central controller 4 is connected to the telephone terminals 6 through the public network 8, although only one telephone terminal 6 is shown in FIG. 1, and functions to transmit audio signals from the telephone terminals 6 to the control station 3 and an audio signal from the control station 3 to the telephone terminals 6 through the public network 8. The telephone terminals 6 are fixed telephone terminals.

Figure 2:
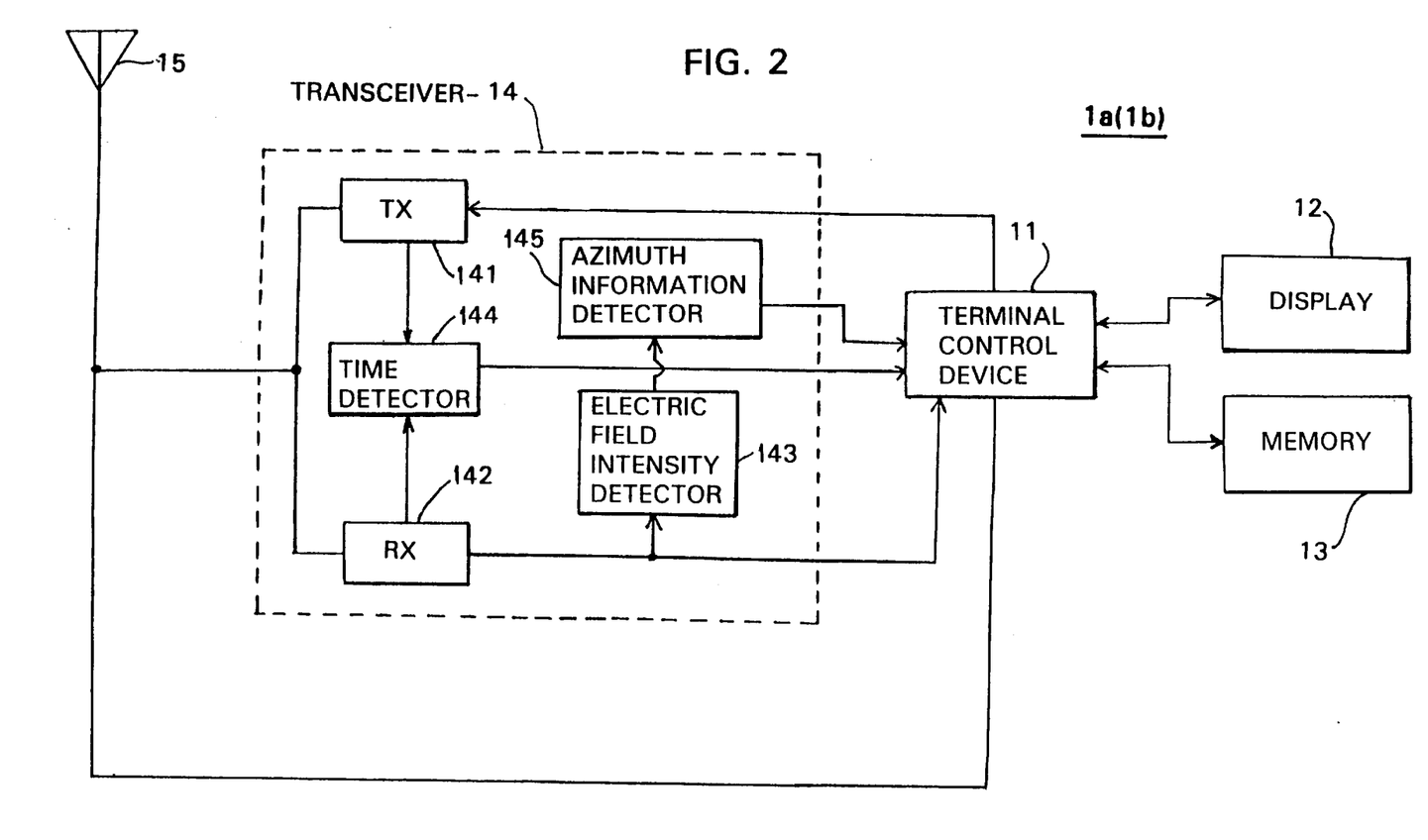
FIG. 2 is a block diagram showing an internal construction of a mobile telephone terminal of the mobile radio communication system shown in FIG. 1.

The mobile telephone terminals 1a and 1b are identical in construction and FIG. 2 is a block diagram of an embodiment of the mobile telephone terminal. In FIG. 2, the mobile telephone terminal 1a (or 1b) is composed of a terminal control device 11, a display device 12, a memory device 13, a transceiver 14 and an antenna 15. The terminal control device 11 is featured by that it can calculate a distance between the mobile terminal and the base station associated therewith and a direction of the base station is seen from the mobile telephone terminal, on the basis of a receiving electric field strength and a delay time as to be described later.

The antenna 15 is preferably a phased-array antenna capable of maximizing a gain of radio wave coming in a specific direction determined by an azimuth information supplied from the terminal control device 11.

The transceiver 14 is composed of a transmitter portion 141, a receiver portion 142, an electric field strength detector portion 143, a time detector portion 144 and an azimuth information detector portion 145.

Figure 3:
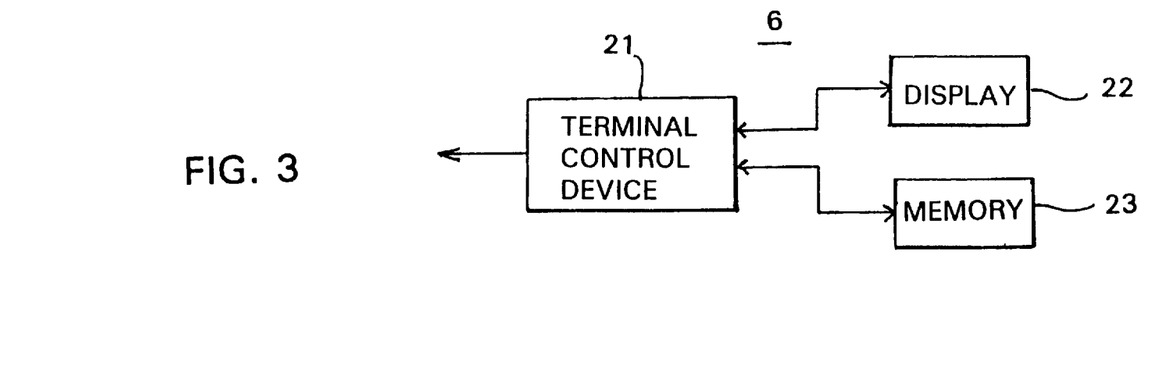
FIG. 3 is a block diagram showing an internal construction of a fixed telephone terminal of the mobile radio communication system shown in FIG. 1.

FIG. 3 is a block diagram of an embodiment of the fixed telephone terminal 6. In FIG. 3, the telephone terminal 6 has a known construction including a terminal control device 21, a display device 22 and a memory device 23. The terminal control device 21 controls operations of the display device 22 and the memory device 23. A handset of the telephone terminal 6 is included in the terminal control device 21.

Figure 4:
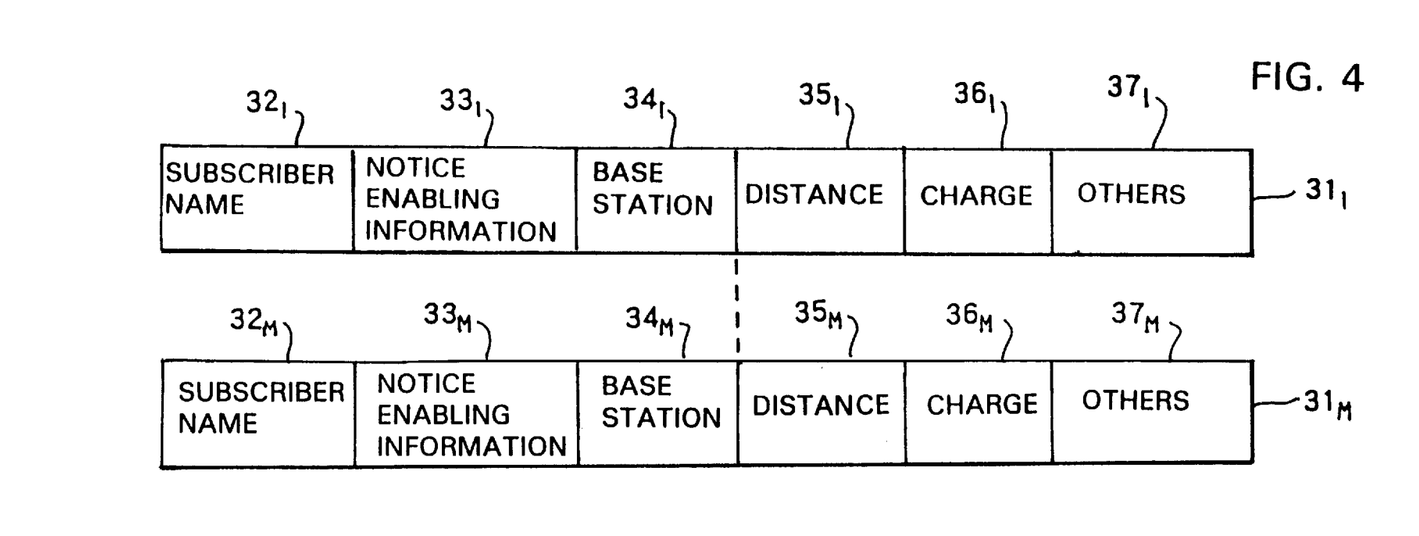
FIG. 4 shows an example of a content stored in a subscriber information memory device shown in FIG. 1.

The subscriber information memory device 5 (FIG. 1) stores an information having such content as shown in FIG. 4. That is, the subscriber information memory device 5 has M records $31_1$ to $31_M$ for respective M subscribers of the mobile radio telephone system.

The M records $31_1$ to $31_M$ are composed of M blocks $32_1$ to $32_M$ for storing subscriber names or information related to the subscribers such as telephone numbers thereof, M blocks $33_1$ to $33_M$ for storing a calling subscriber position notice enabling information, M blocks $34_1$ to $34_M$ for storing information indicative of base stations positioned at centers of radio zones in which the subscriber terminals, that is, the mobile telephone terminals, exist, M blocks $35_1$ to $35_M$ for storing information indicative of distances between the base stations and the mobile telephone terminals and directions of the base stations looked from the mobile telephone terminals and M blocks $36_1$ to $36_M$ for storing other information, respectively.

Figure 5:
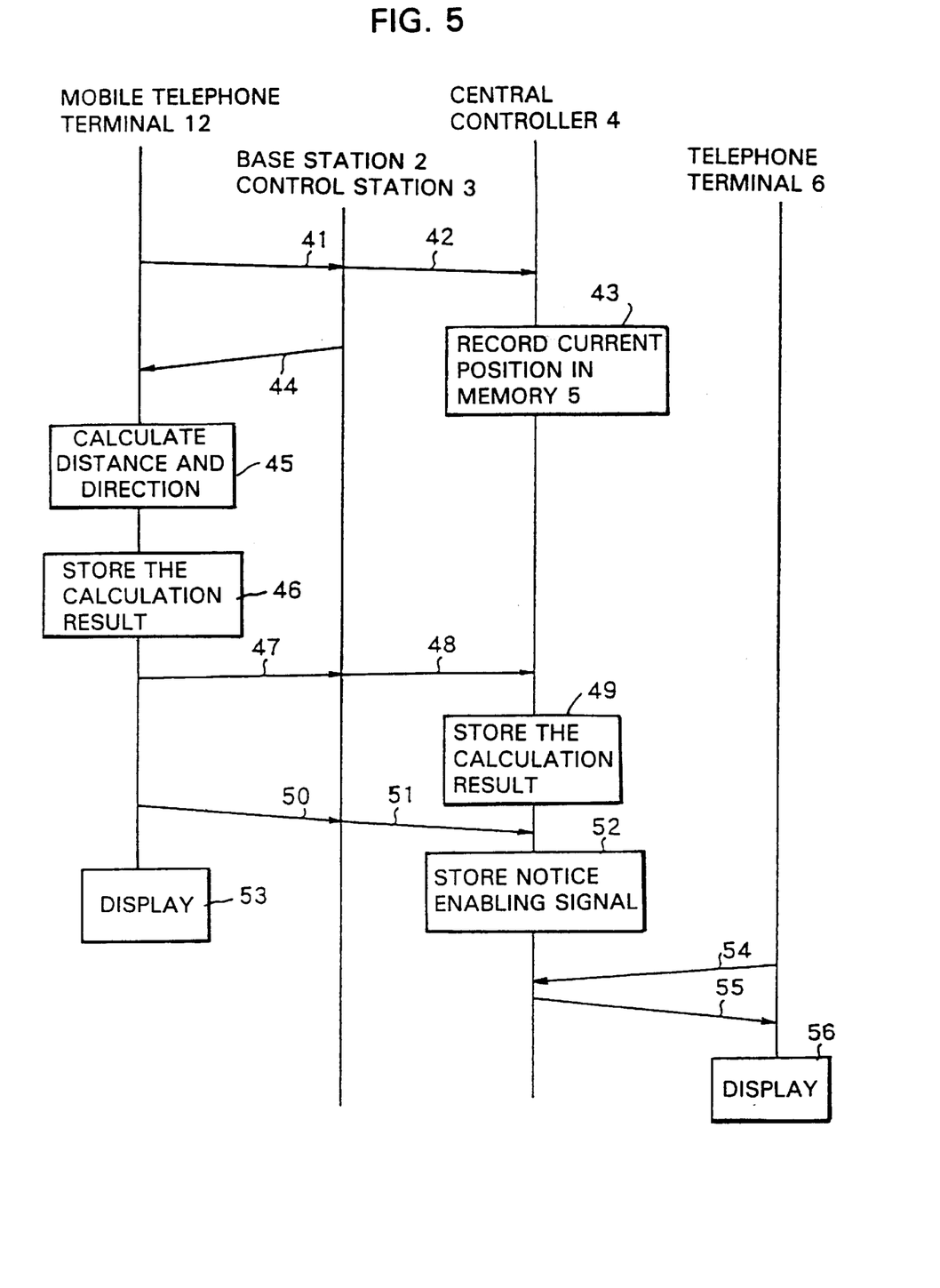
FIG. 5 is a sequence diagram showing operations of the respective constitutional components of the mobile radio communication system shown in FIG. 1.

Now an operation of this embodiment will be described with reference to a sequence diagram shown in FIG. 5. In the cellular mobile radio telephone system having the service area constituted with the cells $7_1$ to $7_N$ of the plurality of base stations $2_1$ to $2_N$, as shown in FIG. 1, it is assumed that the terminal control device 11 of the mobile telephone terminal 1a transmits a position registration request signal through its transceiver 14 and the antenna 13 (step 41).

Then, the base station $2_I$ positioned at the center of the cell $7_I$ in which the mobile telephone terminal 1a exists receives the position registration request signal and gives a notice of the fact that the mobile telephone terminal 1a exists in the cell $7_I$ of the base station to the central controller 4 through the control station 3 (step 42).

The central controller 4 records the position of the mobile telephone terminal 1a in the calling terminal portion of the subscriber information memory device 5 (step 43). That is, assuming that the the record of the mobile telephone terminal 1a in the subscriber information memory device 5 is that shown by the block $31_1$ in FIG. 4, the subscriber information memory device 5 records an information indicative of the base station $2_I$ in the block $34_1$.

Thereafter, the base station $2_I$ transmits a position registration end signal and a registered position signal of the mobile telephone terminal 1a to the latter (step 44). Upon the reception of these signals, the electric field strength detector portion 143 of the transceiver 14 of the mobile telephone terminal 1a detects the electric field strength thereof and the time detector portion 144 thereof detects a time after the transmission of the position registration request signal, that is, a delay time. On the basis of the detected electric field strength and the detected time delay, the distance between the mobile telephone terminal 1a and the base station $2_I$ and the direction of the base station $2_I$ looked from the mobile telephone terminal 1a are calculated (step 45).

That is, as mentioned previously, the mobile telephone terminal 1a employs the phased-array antenna as the antenna 15 thereof and an azimuth information detected by the azimuth detector portion 145 is transmitted to the terminal control device 11, so that the antenna 15 can receive radio wave coming in any direction corresponding to an azimuth indication signal from the terminal control device 11.

By changing the azimuth indication from the terminal control device 11 in measuring electric field strength and delay time, it is possible to perform an omni-directional measurement of electric field strength by means of the transceiver 14. The terminal control device 11 finally determines the direction of the base station $2_I$ seen from the antenna 15 of the mobile telephone terminal when the largest electric field strength is measured.

Then, the terminal control device 11 of the mobile telephone terminal 1a stores the calculated distance and direction in the memory device 13 thereof together with the registered position signal of the mobile telephone terminal 1a (step 46) and then transmits the distance and direction to the base station $2_I$ (step 47). The base station $2_I$ supplies the received distance and direction to the central controller 4 through the control station 3 to store them in the block $35_1$ of the subscriber information memory device 5 as shown in FIG. 4 (steps 48 and 49).

Thereafter, when the mobile telephone terminal 1a transmits the notice enabling signal allowing a notice of the calling subscriber to be sent (step 50), the notice enabling signal is received by the base station $2_I$, supplied therefrom to the central controller 4 through the control station 3 and stored in the block $33_1$ of the subscriber information memory device 5 shown in FIG. 4 (steps 51 and 52).

A user of the mobile telephone terminal 1a can arbitrarily display the information related to the position, distance and direction stored in the internal memory device 13 on the display device 12 according to a method to be described (step 53).

When a notice request signal requesting a notice of a calling terminal position is transmitted from the telephone terminal 6 connected to the public network 8 (step 54), the central controller 4 searches the subscriber information memory device 5 to find any one of the calling terminal position notice enabling blocks $33_1$ to $33_M$ which stores a record of notice enabling information. When there is any block having the record, an information of the position of the mobile telephone terminal, the distance between the latter terminal and the base station and the direction thereof are read out from the record and sent to the fixed telephone terminal 6 (step 55). In response to the information sent, the fixed telephone terminal 6 displays the position of the mobile telephone terminal, the distance from the base station and the direction to the base station on the display device 22 thereof according to a method to be described later (step 56).

Now, the methods for displaying the information on the display device 12 and on the display device 22 will be described. A signal identifying one of the base stations $2_1$ to $2_N$ which is involved in the communication with the mobile telephone terminal 1a or 1b may take in the form of [area code number + cell number] and the distance between the mobile telephone terminal and the base station and the direction to the base station seen from the mobile telephone terminal take in the form of numerical value signals, respectively.

Either the mobile telephone terminal 1a or 1b or the fixed telephone terminal 6, or both, can directly display these signals on the display devices 12 and 22 as numerical values.

Alternatively, by providing a database for combining the numerical value signal in the form of such as [area code number + cell number] with an area name corresponding thereto and a database for combining the numerical value signal indicative of the direction with a compass direction such as [East-North-East] in the memory devices 13 and 23, it is possible to display a concrete name of location of the mobile telephone terminal 1a or 1b and the compass direction on the display devices 12 and 22.

As described, according to the present invention, the fixed telephone terminal 6 and the central controller 4 can know the position of the mobile telephone terminal 1a or 1b. This is particularly advantageous when the user of the mobile telephone terminal 1a or 1b is an old man or a child who is to be protected by someone to some extent. Further, it is possible for a user of the mobile telephone terminal to know his location with respect to the base station or to notify the other side of the communication his location and distance from the base station in an emergency. Further, since the fixed telephone terminal can know the location of the base station and the direction of the base station with respect to the mobile telephone terminal, it is possible for the fixed telephone terminal to preliminarily know a movement of the mobile telephone terminal to another cell.

Although the present invention has been described with the fixed telephone terminal 6 being one side of the communication with the mobile telephone terminal 1a as the other side, the present invention is not limited to such situation and applicable to communication between mobile telephone terminals through a base station or communication with a fixed telephone terminal and a mobile telephone terminal, with the fixed telephone terminal being a calling terminal.

As described hereinbefore, since, according to the present invention, both a mobile telephone terminal and a destination terminal can display a distance between the mobile telephone terminal and a base station and a direction and location of the base station seen from the mobile telephone terminal, it is possible for the mobile telephone terminal to confirm the distance to the base station and the direction and location of the base station with respect to the mobile terminal as well as to enable the destination terminal to confirm the same.

Therefore, according to the present invention, it is possible for the mobile telephone terminal to give a notice of a location of a mobile telephone terminal to the fixed telephone terminal in an emergency, and it is possible for the fixed telephone terminal to preliminarily know a movement of the mobile telephone terminal to another cell and/or to monitor a location of the mobile telephone terminal a user of which is to be protected. Therefore, the applicability of the mobile radio telephone system is considerably improved.

While the present invention has been described with reference to specific embodiments thereof, it will be appreciated by those skilled in the art that numerous variations, modifications and embodiments are possible, and, accordingly, all such variations, modifications and embodiments are to be regarded as being within the spirit and scope of the present invention.

What is claimed is:

1. A mobile radio telephone terminal capable of communicating with another telephone terminal through a selected base station, the mobile radio telephone terminal comprising:

first detection means for detecting a distance between said mobile radio telephone terminal and said selected base station sending a first signal to said mobile radio telephone terminal;

second detection means for detecting a direction of said selected base station as seen from said mobile radio telephone terminal;

display means for displaying the distance and the direction;

control means for controlling a direction of an antenna in accordance with an electric field strength of the first signal to obtain a maximum gain;

transmitting means for transmitting a second signal to said selected base station;

receiving means for receiving a third signal transmitted from said base station in response to the second signal; and measuring means for measuring a time period from the transmission of the second signal to the reception of the third signal;

wherein said first detection means detects the distance on the basis of the time period measured by said measuring means, and the second signal is a position registration request signal requesting a registration of the position of said mobile telephone terminal.

2. The mobile radio telephone terminal claimed in claim 1, wherein said receiving means comprises a phased-array antenna.

3. The mobile radio telephone terminal claimed in claim 2, further comprising:

third detection means for detecting a receiving electric field strength of said third signal;

azimuth information generating means for generating an azimuth information on the basis of the receiving electric field strength detected by said third detection means; and control means for controlling said phased-array antenna on the basis of the azimuth information generated by said azimuth information generating means.

4. The mobile radio telephone terminal claimed in claim 3, wherein said second detection means detects the azimuth information when the receiving electric field strength becomes maximum, as the direction.

5. The mobile radio telephone terminal claimed in claim 4, wherein said display means displays the distance and the direction in the form of an area name and a compass direction, respectively.

6. The mobile radio telephone terminal claimed in claim 5, wherein said second signal is a position registration request signal for requesting a registration of position.

7. The mobile radio telephone terminal claimed in claim 4, wherein said transmitting means is adapted to transmit the distance and the position to said selected base station.

8. A mobile radio telephone system in which an available service area is constituted with radio zones of a plurality of base stations and a mobile telephone terminal selects at least one base station and communicates with a fixed telephone terminal through the selected base station, said mobile telephone terminal comprising:

first detection means for detecting a distance between said mobile radio telephone terminal and said selected base station sending a first signal to said mobile radio telephone terminal;

second detection means for detecting a direction of said selected base station as seen from said mobile radio telephone terminal;

display means for displaying the distance and the direction;

control means for controlling a direction of an antenna in accordance with an electric field strength of the first signal to obtain a maximum gain;

transmitting means for transmitting a second signal to said selected base station;

receiving means for receiving a third signal transmitted from said base station in response to the second signal; and measuring means for measuring a time period from the transmission of the second signal to the reception of the third signal, wherein said first detection means detects the distance on the basis of the time period measured by said measuring means, and the second signal is a position registration request signal requesting a registration of the position of said mobile telephone terminal.

9. The mobile radio telephone system claimed in claim 8, wherein said receiving means comprises a phased-array antenna.

10. The mobile radio telephone system claimed in claim 9, wherein said mobile radio telephone terminal further comprises:

third detection means for detecting a receiving electric field strength of the third signal;

azimuth information generating means for generating azimuth information on the basis of the receiving electric field strength detected by said third detection means; and control means for controlling said phased-array antenna on the basis of the azimuth information generated by said azimuth information generating means.

11. The mobile radio telephone system claimed in claim 10, wherein said second detection means detects the azimuth information when the receiving electric field strength becomes maximum, as the direction.

12. The mobile radio telephone system claimed in claim 11, wherein said display means displays the distance and the direction as an area name and a compass direction, respectively.

13. The mobile radio telephone system claimed in claim 11, wherein said transmitting means is adapted to transmit a signal indicative of the distance and the direction to said base station.

14. The mobile radio telephone system claimed in claim 13, wherein said base station receives and stores the signal indicative of the distance and the direction transmitted from said mobile telephone terminal.

15. The mobile radio telephone system claimed in claim 14, wherein said base station responds to a calling position notice request from said fixed telephone terminal to transmit the distance and the position of said mobile telephone terminal to said fixed telephone terminal.

16. The mobile radio telephone system claimed in claim 15, wherein said base station responds to the calling position notice request when said base station receives a notice enabling signal transmitted from said mobile telephone terminal.

17. A control method for controlling a mobile radio telephone terminal, comprising, at said mobile terminal, the steps of:

detecting a distance between said mobile radio telephone terminal and a signal source sending a first signal to said mobile radio telephone terminal;

detecting a direction of said signal source as seen from said mobile radio telephone terminal;

displaying the distance and the direction;

controlling a direction of an antenna according to an electric field strength of the first signal to obtain a maximum gain;

transmitting a second signal from said mobile radio telephone terminal to said signal source, said second signal is a position registration request signal requesting a registration of the position of said mobile telephone terminal;

receiving a third signal transmitted from said signal source, in response to the second signal;

measuring a time period from the transmission of the second signal to the reception of the third signal; and detecting the distance on the basis of the time period.

18. The control method claimed in claim 17, further comprising the steps of:

detecting a receiving electric field strength of the third signal;

generating azimuth information on the basis of the receiving electric field strength; and detecting the azimuth information when the receiving electric field strength becomes maximum, as the direction.

19. The control method claimed in claim 18, wherein the distance and the direction are displayed as an area name and a compass direction, respectively.

20. The control method claimed in claim 19, further comprising the step of transmitting a signal indicative of the distance and the position to said signal source.

21. A control method for controlling a mobile radio telephone system in which an available service area includes radio zones of a plurality of base stations and a mobile telephone terminal selects at least one base station and communicates with a fixed telephone terminal through the selected base station, said mobile telephone terminal:

detecting a distance between said mobile radio telephone terminal and said base station sending a first signal to said mobile radio telephone terminal;

detecting a direction of said base station as seen from said mobile radio telephone terminal;

displaying the distance and the direction;

controlling a direction of an antenna according to an electric field strength of the first signal to obtain a maximum gain;

transmitting a second signal to said base station, said second signal is a position registration request signal requesting a registration of the position of said mobile telephone terminal;

receiving a third signal transmitted from said base station, in response to the second signal;

measuring a time period from the transmission of the second signal to the reception of the third signal; and detecting the distance on the basis of the measured time period measured.

22. The control method claimed in claim 21, wherein said mobile telephone terminal further:

detecting a receiving electric field strength of the third signal;

generating an azimuth information on the basis of the receiving electric field strength; and detecting the azimuth information when the receiving electric field strength becomes maximum, as the direction.

23. The control method claimed in claim 22, wherein said mobile telephone terminal further transmits a signal indicative of the distance and the direction to said base station.

24. The control method claimed in claim 23, wherein said base station receives and stores the signal indicative of the distance from said mobile telephone terminal and the direction as seen from said base station.

25. The control method claimed in claim 24, wherein said base station notifies said fixed telephone terminal the distance and the direction, in response to a calling position notice request from said fixed telephone terminal.

26. The control method claimed in claim 25, wherein said base station responds to the calling position notice request when it receives a notice enable signal from said mobile telephone terminal.

27. A mobile radio telephone terminal capable of communicating with another telephone terminal through a selected base station, the mobile radio telephone terminal comprising:

a first detector detecting a distance between said mobile radio telephone terminal and selected base station sending a first signal to said mobile radio telephone terminal;

a second detector detecting a direction of said selected base station as seen from said mobile radio telephone terminal;

a display displaying the distance and the direction;

a controller controlling a direction of an antenna in accordance with an electric field strength of the first signal to obtain a maximum gain;

a transmitter transmitting a second signal to said selected base station;

a receiver receiving a third signal transmitted from said base station in response to the second signal; and a measuring device measuring a time period from the transmission of the second signal to the reception of the third signal;

wherein said first detector detects the distance on the basis of the time period measured by said measuring device, and the second signal is a position registration request signal requesting a registration of the position of said mobile telephone terminal.

28. The mobile radio telephone terminal claimed in claim 27, wherein said receiver comprises a phased-array antenna.

29. The mobile radio telephone terminal claimed in claim 28, further comprising:

a third detector detecting a receiving electric field strength of said third signal;

an azimuth information generating device generating an azimuth information on the basis of the receiving electric field strength detected by said third detector; and a control device controlling said phased-array antenna on the basis of the azimuth information generated by said azimuth information generating device.

30. The mobile radio telephone terminal claimed in claim 29, wherein said second detector detects the azimuth information when the receiving electric field strength becomes maximum, as the direction.

31. The mobile radio telephone terminal claimed in claim 30, wherein said display displays the distance and the direction in the form of an area name and a compass direction, respectively.

32. The mobile radio telephone terminal claimed in claim 31, wherein said second signal is a position registration request signal for requesting a registration of position.

33. The mobile radio telephone terminal claimed in claim 30, wherein said transmitter is adapted to transmit the distance and the position to said selected base station.

34. A mobile radio telephone system in which an available service area includes radio zones of a plurality of base stations and a mobile telephone terminal selects at least one base station and communicates with a fixed telephone terminal through the selected base station, said mobile telephone terminal comprising:

a first detector detecting a distance between said mobile radio telephone terminal and said selected base station sending a first signal to said mobile radio telephone terminal;

a second detector detecting a direction of said selected base station as seen from said mobile radio telephone terminal;

a display displaying the distance and the direction;

a controller controlling a direction of an antenna in accordance with an electric field strength of the first signal to obtain a maximum gain;

a transmitter transmitting a second signal to said selected base station;

a receiver receiving a third signal transmitted from said base station in response to the second signal; and a measuring device measuring a time period from the transmission of the second signal to the reception of the third signal, wherein said first detector detects the distance on the basis of the time period measured by said measuring device, and the second signal is a position registration request signal requesting a registration of the position of said mobile telephone terminal.

35. The mobile radio telephone system claimed in claim 34, wherein said receiver comprises a phased-array antenna.

36. The mobile radio telephone system claimed in claim 35, wherein said mobile radio telephone terminal further comprises:

a third detector detecting a receiving electric field strength of the third signal;

an azimuth information generating device generating azimuth information on the basis of the receiving electric field strength detected by said third detector; and a control device for controlling said phased-array antenna on the basis of the azimuth information generated by said azimuth information generating device.

37. The mobile radio telephone system claimed in claim 36, wherein said second detector detects the azimuth information when the receiving electric field strength becomes maximum, as the direction.

38. The mobile radio telephone system claimed in claim 37, wherein said display displays the distance and the direction as an area name and a compass direction, respectively.

39. The mobile radio telephone system claimed in claim 37, wherein said transmitter is adapted to transmit a signal indicative of the distance and the direction to said base station.

40. The mobile radio telephone system claimed in claim 39, wherein said base station receives and stores the signal indicative of the distance and the direction transmitted from said mobile telephone terminal.

41. The mobile radio telephone system claimed in claim 40, wherein said base station responds to a calling position notice request from said fixed telephone terminal to transmit the distance and the position of said mobile telephone terminal to said fixed telephone terminal.

42. The mobile radio telephone system claimed in claim 41, wherein said base station responds to the calling position notice request when said base station receives a notice enabling signal transmitted from said mobile telephone terminal.

* * * * *